United States Patent
Dideriksen et al.

(10) Patent No.: US 10,366,528 B2
(45) Date of Patent: Jul. 30, 2019

(54) INTERACTIVE POINTS OF INTEREST FOR 3D-REPRESENTATIONS

(71) Applicant: Amazon Technologies, Inc., Seattle, WA (US)

(72) Inventors: Thomas Lund Dideriksen, Seattle, WA (US); Eric Paul Bennett, Seattle, WA (US); Timothy Andrew Ong, Sammamish, WA (US); Gonzalo Alberto Ramos, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 14/963,144

(22) Filed: Dec. 8, 2015

(65) Prior Publication Data
US 2017/0161937 A1     Jun. 8, 2017

(51) Int. Cl.
*G06T 15/20* (2011.01)
*G06F 3/0484* (2013.01)
*G06F 3/0481* (2013.01)
*G06F 3/0488* (2013.01)
*G06T 13/40* (2011.01)

(52) U.S. Cl.
CPC .......... *G06T 15/20* (2013.01); *G06F 3/04815* (2013.01); *G06F 3/04842* (2013.01); *G06F 3/04845* (2013.01); *G06F 3/04886* (2013.01); *G06F 2203/04803* (2013.01); *G06T 13/40* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 2005/0010876 A1* | 1/2005 | Robertson | G06F 3/0481 715/782 |
| 2007/0300168 A1* | 12/2007 | Bosma | G06F 3/1205 715/820 |
| 2008/0072145 A1* | 3/2008 | Blanchard | G06F 17/22 715/273 |
| 2009/0125801 A1* | 5/2009 | Algreatly | G06F 3/0481 715/234 |
| 2009/0315766 A1* | 12/2009 | Khosravy | G06Q 30/0241 342/357.64 |
| 2009/0319181 A1 | 12/2009 | Khosravy et al. | |

(Continued)

OTHER PUBLICATIONS

PCT Search Report and Written Opinion dated Mar. 20, 2017 for PCT Application No. PCT/US16/65649, 17 pages.

*Primary Examiner* — Michael J Cobb
(74) *Attorney, Agent, or Firm* — Lee & Hayes, P.C.

(57) ABSTRACT

The display of 3D-representations involves navigation and interaction with users engaged with the display. Points of interest (POIs), as applied to areas of interest for a 3D-representation, are anchored to the 3D-representation on the display and are moveable in synchrony with the 3D-representation navigation. POIs are presented in which interactive actions are associated with the POIs. When a user selects one of the interactive actions associated with a POI, the selection can prompt the display of a new 3D-representation of an item related to the 3D-representation to which the POI is anchored, thereby improving access and analysis about information for related items.

20 Claims, 7 Drawing Sheets

(56) References Cited

U.S. PATENT DOCUMENTS

| | | | | |
|---|---|---|---|---|
| 2009/0327969 A1* | 12/2009 | Estrada | ............... | G06F 3/04815 |
| | | | | 715/848 |
| 2010/0169795 A1 | 7/2010 | Hyndman et al. | | |
| 2010/0169837 A1 | 7/2010 | Hyndman | | |
| 2011/0130949 A1* | 6/2011 | Arrasvuori | ......... | G01C 21/3638 |
| | | | | 701/532 |
| 2011/0265030 A1 | 10/2011 | Lin et al. | | |
| 2013/0057581 A1* | 3/2013 | Meier | ................... | G02B 27/017 |
| | | | | 345/633 |
| 2013/0093787 A1* | 4/2013 | Fulks | ...................... | G06T 11/60 |
| | | | | 345/629 |
| 2013/0332890 A1* | 12/2013 | Ramic | ................. | G06F 3/04815 |
| | | | | 715/852 |
| 2014/0160131 A1* | 6/2014 | Azizi | ................... | G06T 11/206 |
| | | | | 345/440 |
| 2015/0015504 A1* | 1/2015 | Lee | ..................... | G06F 3/04845 |
| | | | | 345/173 |
| 2015/0066365 A1 | 3/2015 | Khosravy et al. | | |
| 2015/0091903 A1* | 4/2015 | Costello | ................. | G06T 15/20 |
| | | | | 345/426 |
| 2015/0205455 A1* | 7/2015 | Shaw | .................... | G06F 3/0482 |
| | | | | 715/834 |
| 2016/0019511 A1* | 1/2016 | Betesh | ................. | G06Q 20/123 |
| | | | | 705/27.1 |
| 2016/0154974 A1* | 6/2016 | Kisnisci | .............. | G06F 21/6245 |
| | | | | 726/28 |
| 2016/0364088 A1* | 12/2016 | Bejot | ................... | G06F 3/0482 |
| 2017/0139548 A1* | 5/2017 | De Las Heras | ....... | G06F 3/0482 |

* cited by examiner

INTERACTIVE POINTS OF INTEREST FOR 3D-REPRESENTATIONS

BACKGROUND

The display of three-dimensional (3D) models includes technical areas involving navigation and interaction with the models. 3D models can be presented on a display as a 3D-representation. A Point of Interest (POI) is a designation applied to an area of interest for a 3D-representation of an item. It can be presented as a label, icon or any object on the surface of the 3D-representation for the item at the associated area of interest. POIs can be anchored to the 3D-representation. There is a need to improve the navigation and interaction of 3D-representations including POIs.

BRIEF DESCRIPTION OF THE DRAWINGS

The detailed description is presented with reference to the accompanying figures. The same reference numbers in different figures indicate similar or identical items.

DETAILED DESCRIPTION

Figure 1:
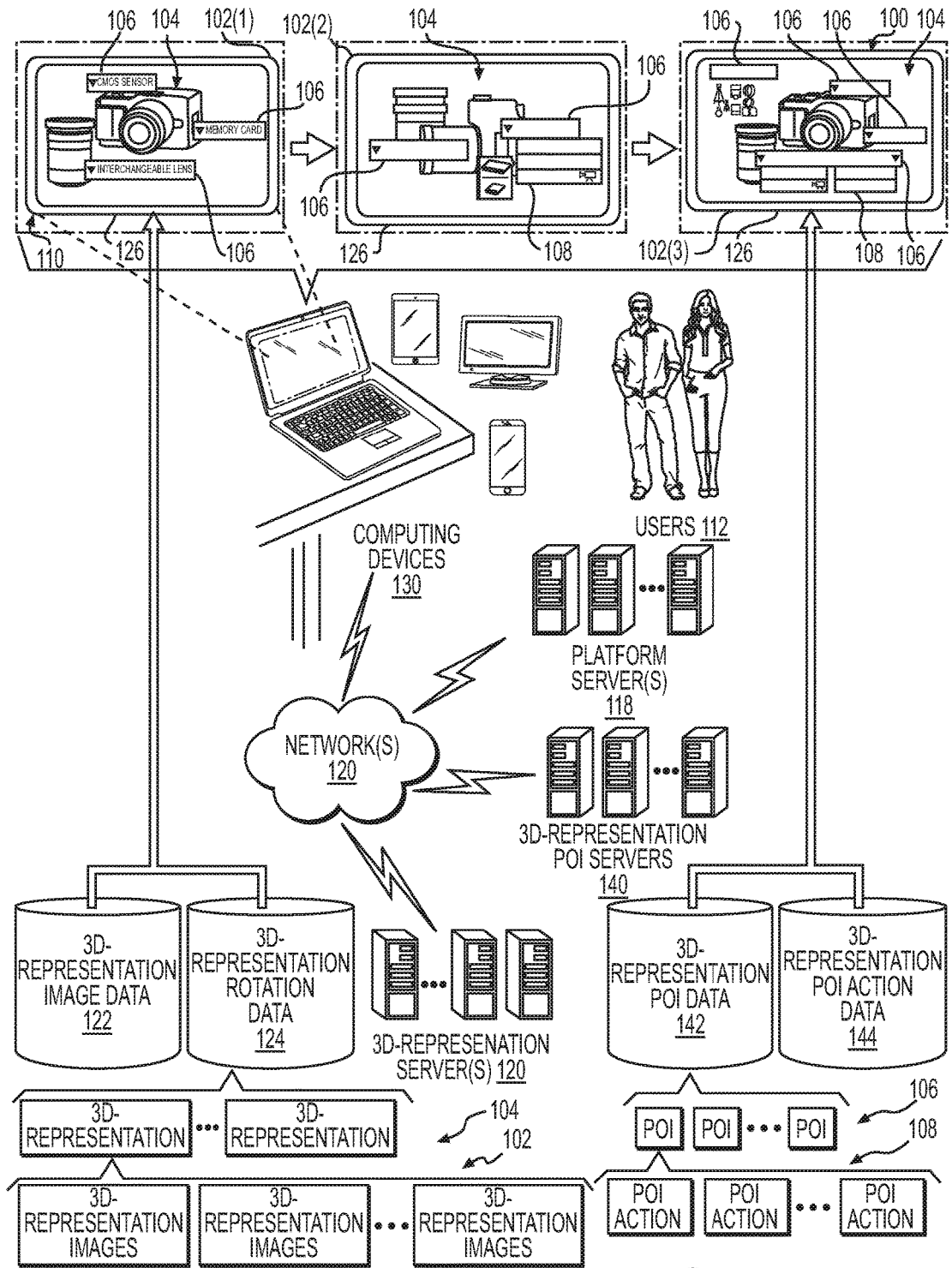
FIG. 1 is a schematic diagram of an illustrative computing environment useable to provide 3D-representations of items with interactive POIs for platforms.

This disclosure is directed to a system and method of navigation and interaction with 3-Dimensional (3D) models on a display, including Points of Interest (POIs). The presentation of a 3D model on a display of a computing device also is referred to as a 3D-representation herein. A POI is a designation applied to an area of interest within a 3D model and appears in the 3D-representation of the model. It provides data associated with the particular area of the 3D-representation. The display of 3D-representations with POIs includes technical areas involving the navigation and interaction with the 3D-representations.

A POI can be presented as a label, icon or any object on or of a 3D-representation at an associated area of interest. A POI further can be anchored to the 3D-representation either on or above the surface of the 3D-representation. Exemplary areas for POIs are visual points on or above the surface of the 3D-representation of an item (e.g., a feature of the item or a feature within the environment in which the item is presented). Additional exemplary areas are a visual area of the item (e.g., a portion of the item), a description of the item (e.g., the top, bottom or sides of the item), a point or designation above the surface of the item, such as the perspective of view of the item (e.g., aerial view) or context or environment in which the item is being represented (e.g., the impact of the environment on the item, whether the item is represented in an outdoor environment versus an indoor environment or subject to varying whether conditions or during the course of use of the item over time, such as patterns of use and wear are represented). In further embodiments, the POIs can be used to designate points, areas or narratives related to other senses associated with the user experience in interacting with the 3D-representation, such as for example, a smell or sound associated with the 3D-representation, or a condition of the environment in which the 3D-representations is presented, such as a temperature or time period in order to present the impact on the changes in the environment on the 3D-representation. These are examples of designations for the POIs and do not limit the scope of the embodiments of the invention.

The creation of 3D models, their presentation as 3D-representations on a display (such as a computing device) and the manipulation of the 3D-representation to display different sides and aspects of the 3D models are now described. The creation of a 3D model can be based on real-world spatial data captured via any of a variety of physical and photographic devices with resulting data that may or may not have been further modified by manual or automated algorithmic components. In one of example of 3D model rendering, a region of space in the modeled world is identified which can be generated for display; it is equivalent to the field of view of a notional camera. This region is called a view frustum. In generating a presentation of the 3D model for a display, the portion of the scene outside the view frustum is eliminated. The 3D-representation presented on a display, or another component viewable by a user, is called a viewing plane. After the 3D-representation is created, POIs as well as additional components of the POIs as described in the embodiments herein can be added as part of a process called "authoring." However, the processing environment in which capturing, authoring and rendering occurs can vary depending upon the implementation of these processes. For example, the processing can occur as a pre-processing step in any number of environments such as a cloud environment, server or other processing environment and files containing captured 3D-representations, authored POI and related components and/or data from which POIs and related components can be received at the local browser or client site. Alternatively, portions of the processing, including the rendering the POIs, can occur at the local browser or client. These are examples of the approach to processing and presenting the 3D-representation remote from and at the local browser or client environment. These processes can occur in a variety of environments and therefore the environment in which the processing occurs does not limit the embodiments of this invention.

As POIs are anchored to the 3D model, the POIs remain in contact with the related areas of the 3D model even as the model is rotated. The navigation of 3D-representations can be related to the selection of POIs. For example, 3D-representation navigational capabilities include, moving, rotating and zooming of 3D-representations of items modeled in 3D. Movement of a 3D-representation derived from a 3D model can, in an exemplary embodiment, be initiated by a user based on advancing towards a POI. Even where navigation occurs without reference to POIs, the POIs move in synchrony with the areas of the 3D-representation with which they are related, or anchored. In addition, in the embodiments described above, navigation can be aided by the use of POIs as a reference point for users to navigate towards. As the 3D-representation navigation moves areas of interest associated with POIs into the viewing plane and outside of the viewing plane, the associated POIs similarly will be viewable by users or removed from the viewable display and thus not available for the user to select. Thereafter, navigation of the 3D-representation can once again move a POI to return to the viewing plane and therefore be selectable by the user.

In one embodiment, navigation of the 3D-representation can include advancing towards a particular POI, or to place the POI as the focal point of the display. The focal point can be identified as the center of the or within a range of the center x and y coordinates (hereinafter referred to as "the center area") of the display. Where there are multiple POIs, transition of the 3D-representation can result in one POI being located closest to the center area of the display upon completion of navigation of the 3D-representation. In this embodiment, the resulting POI closest to the center area automatically can be expanded to display the actions. This is one manner in which the POIs can act as a navigation aid for the 3D-representations. In alternative embodiments, the user can select specific POIs regardless of their position within the viewing plane in order to expand or show the actions. In still further alternative embodiments, both the POI located in the center area of the display as well as POIs selected can be expanded to show actions, so that multiple POIs are automatically or selectably expanded to show actions. The approaches to 3D-representation navigation and POI or POI action selections do not limit the embodiments of this invention.

In addition, user interactions or selection can include input provided by user-input techniques such as movement of a selection object on the display (e.g., cursor) using any user input devices (e.g., mouse, stylus), various forms of touch interactions (e.g., touch, tap, multi-tap, pinch/spread, touch and hold, swipe, multi-finger swipe, drag-and-drop, etc.), voice-based (e.g., speech or utterance recognition), gestures based (e.g., movement of the display itself or a portion of the display, shaking of the display) and so on. User interaction or selection approaches do not limit the embodiments of this invention.

An example of a platform in which 3D-representations are displayed, along with associated data, is a platform for the evaluation of purchasing products. 3D-representations of 3D models of products, along with POIs anchored to the 3D models, can be rendered on a display, and 3D-representation navigational capabilities, such as moving, rotating and zooming based on the selection of POIs, can contribute to a user or purchaser's experience in gaining additional views and of products and associated data. In addition, the user's selection of POIs and related actions can prompt the display of a related product, or of a 3D-representation for a 3D model of the related product. For implementations of 3D models with POIs and interactive actions, there is a technical problem in that the presentation of 3D-representations and POIs add data to an already crowded presentation of information on a display for evaluation by a user. This complicates the overall objective for the user when purchasing products, of a highly efficient and rapid selection, evaluation and purchase experience. That is, the addition of new information and interactions with the user for the 3D-representation can reduce the bandwidth of the user for whom it is intended to assist and streamline the process. However, for embodiments of the present invention, the use of POIs and interactive actions as a basis to add information and relate modeled products to other related products (such as accessories or other product category items, where these items can be presented as 3D-representations or more traditional images, video or other forms of content) based on the point at which the user has focused on an aspect of a 3D-representation improves the efficiency of displaying data to users for evaluation. In addition, the use of POIs and interactive actions can connect 3D-representations of products to other types of presentations of products, such as images or videos. In this way, the use of POIs can be part of a traditional presentation of images. In further exemplary embodiments, the presentation of the related 3D-representation on a sequential display or the same display as the earlier presented 3D-representation contributes to improving the efficiency of displaying and assessing data. In addition, 3D-representations, POIs and related 3D-representations can be scaled in order to present the user with the additional information associated with the user's selections. In still further embodiments, the POIs and interactive action(s) which prompt the presentation of the related products or 3D-representations, improves the efficiency of displaying data to users and overcomes a technical area of reducing efficiency when additional data is presented on a display. The embodiments of this invention involve the dynamic presentation of additional data about a 3D-representation or a related 3D-representation based upon a detected condition of selection by the user of data specific to POIs for the 3D-representation. The system and method of the embodiments of the invention reduce the historic use of multiple steps or multiple interface pages loaded on the display to add information about a 3D-representation or transition between related 3D-representations. As a result, for exemplary embodiments of the invention, the reduction in the number of steps or interfaces to provide additional rich content for the 3D-representation as well as related 3D-representations improves the operability of the system by enabling the user to receive the additional data and experiences without navigating away from the earlier 3D-representation or at least a portion of the earlier 3D-representation from which the related 3D-representation was selected. By maintaining and added data on a single loaded interface page, the user also can maintain continuity between the related data of the earlier 3D-representation and the related 3D-representation. The reduction in navigation to new interface pages for the user is another feature of the embodiments of this invention. These are embodiments of the invention which contribute to enhancing the presentation, evaluation, organization and efficiency, among other advantages, of data which are advancements beyond the ordinary operations of computers. Rather, the embodiment of this invention improve the operation of existing technologies or technical fields.

In one embodiment of the present invention related to purchasing products, the 3D-representation can be for a product offered for sale. When a potential purchaser, or user, launches a platform for the purchase of products, the user can access servers via a variety of networks, for example, the World Wide Web, or use other approaches to communicate information, such as cloud-based services, to display potential products for purchase. The display includes images and descriptive data, with which the user determines whether or not to purchase the product. With the emergence of 3D models of products and navigation, a product can be displayed as a 3D model or 3D-representation, as described above. The user experience in reviewing potential products can be directly correlated with the purchase of the products. POIs can provide an entry point to further explore data about the item and enhance the user experience for evaluating the products. In this way, POIs can be a trigger point for initiating a new and immersive level of interaction with the item focused on a particular area of interest. The POIs can be associated with rich content, such that the content is displayed on the use's display as the user rotates the 3D model of the item. The area of interest is identified by placement of the POIs on or above the surface of the 3D-representation. The POIs can be predetermined and presented to the users for their selection or as a navigational aid for manipulation of the 3D-representation. In alternative embodiments, the immersion experience can include creating new POIs and populating the new POIs based on an analysis or search by the platform processing of data associated with the user-identified POIs. Therefore, the identification, creation or approach to adding POIs to 3D-representations does not limit the embodiments of this invention.

For example, with the selection of an item on a platform, POIs that are predetermined by the vendor can be added to the 3D-representation. The following item is presented in this example: a Minion Office Toy is an item which functions to provide a whimsical approach at work to announce on the intra-office network the availability of free food and beverages and scheduled office parties, as well as to document office parties. Three POIs can be added to the item as follows: first, a POI associated with a foot of the Minion titled "Minion's Foot: Surface Attachment," second, a POI associated with the glasses of the Minion titled "Minion's Glasses: Camera," and third, a POI associated with the Minion's belt titled "Minion's Belt: Camera Shutter."

POIs can be dynamically expanded or replaced with listed content representing one or multiple actions to provide additional data about the functionality of the POI. In this manner, the POIs become highly interactive. One presentation is a hierarchical list of actionable content, which can be triggered by selecting an action object, such as a drop-down icon, associated with the POI designation, such as a title or label. This is one of many examples of how to present actionable content. Therefore, the approaches to expanding a POI to display one or multiple actions does not limit the embodiments of this invention.

Returning to the exemplary Minion Office Toy item, for the POI labeled "Minion's Glasses: Camera," multiple actions can be presented to provide additional data about the Minion's glasses. The "Minion's Glasses: Camera" label can be dynamically expanded or replaced with individually listed or otherwise presented content representing multiple actions to provide additional data about the Minion's glasses POI. One presentation is a single actionable content item, such as the word "Description" which, when scrolled over by a user, can expand to explain that the glasses provide a camera function which, when activated, initiate a photograph or video of the viewable range from the glasses. In addition, activation of the camera shutter function can take a photo of the office party decorations as an announcement that the party has begun and also can be used to take photographs during the party for distribution on the intra-office network. The user thereby is enabled to further explore additional data about the item. Another action in this exemplary embodiment can be another designation label "Related Office Party Toys," which is linkable. When activated, the designation can trigger a transition to a sub-set display of related items on the same web page or another page showing the items, or one of many approaches to triggering a transition to related items or features of items on platforms. The exploration is based on selecting between multiple actions associated with a POI that focuses the user on an area of interest for the 3D-representation.

In one embodiment, the list of actions that are displayed for a given POI can be presented in a hierarchical presentation in which the POI label acts as an identifier of a column, and one or multiple actions aligned with the column are placed as rows. The presentation of actions in rows can also replace the column label in alternative embodiments, so that the designation label or title is replaced with the list of actions, or the content for POIs and POI actions can be presented in any number of approaches for the presentation of content on platforms. These are examples of presenting content and options between multiple items of content as one or more designations for POIs, or actions relating to the POIs; the examples herein do not limit embodiments of this invention.

In this exemplary embodiment, another POI labeled "Minion's Belt: Camera Shutter," when selected by the user, can be dynamically expanded or replaced with individually listed or otherwise presented content representing multiple actions to provide additional data about the functionality of the Minion's belt POI. One presentation is a list of actionable content, such as a list beginning with the word "Description" which, when scrolled over by a user, can expand to present that the belt is the camera shutter or video button to activate the camera feature of the Minion's glasses. In this way, the Minion enables a person to take a photo or video by activating the Minion's belt, with the idea of capturing images and video of office events, as well as to trigger the distribution of the images to an intra-office network, so that employees can be alerted in a whimsical manner to the availability of free food and beverages or photos from a party event. Another action connected to the Minion's belt POI can be a designation of "Create an Invitation" which, when activated, can trigger an invitation creation program or transition to a new platform with a known calendaring application. The designation can also include an email icon for selection in order to create an email distribution.

Yet another action connected to the Minion's belt POI can be a listing underneath the "Create an Invitation" link, labeled "Office Party Supplies." When activated, the link can transition to displaying for potential purchase, a set of party accessories to accompany the office event. Further actions can be additional listings underneath the "Office Party Supplies" link, such as a video icon with the title "Show Past Office Party Videos," a website link with title "Planning Office Parties, the How To Guide," as well as an "Office Social Media" link. Upon triggering the video icon, website link and social media link, historic office parties, tips and guidelines for hosting the party and access to social media pages can be shown to the user, respectively. In this example, there are multiple actions associated with the Minion's belt POI.

In alternative embodiments, POIs can present solely a description of the POI based on the designation label, "Minion's Foot: Surface Attachment." When the user selects this POI, the label or title when scrolled over can expand as a text box to provide an explanation that each foot has a suction cup sole to enable it to be removably attached to a surface such as a counter in the kitchen, or even on a cabinet or wall. In this way, the Minion is enabled to be positioned on flat and also vertical surfaces to maximize its positioning (such as on a wall) and durability, when functioning to record office parties or information about the kitchen. In this manner, the POI simply calls attention to this area of the item. For another alternative embodiment, the POI label designation is actionable in that when the designation is selected, such as by a user scrolling over the label, a separate window can be activated to provide additional information, with additional actions listed within the separate window, such as a separate web page or browser window.

In further alternative embodiments, the POIs presented for a 3D-representation can have no actions associated with them (that is, they provide static content rather than an actionable option), or one or more POIs can have actions associated with them, while one or more of the other POIs need not have actions associated with them. Examples of static content are text or an image. In addition, in further embodiments, one or more of the POIs can have subsets of actions associated with a hierarchical tier of initial actions. In this way, the POI actions can be organized based on any organizational structure or framework in order to provide dynamic interaction with the user through interactive actions or descriptions associated with the POIs.

Examples of interactive actions for POIs are as follows: a user interface element that when selected causes a video or an animation to appear on the screen, a link to text or an image or a link to at least a portion of another 3D-representation that is related to the 3D-representation presented on the display, components for the 3D-representation or accessories for the 3D-representation. Additional examples of interactive actions for POIs are as follows: a link option to associated data, content, contextual or non-contextual data; a multimedia activity option; an animation option; a selection option to generate a related 3D-representation, components, features, accessories, customizable components, related items or related item categories; a selection option to generate a new user experience for the potential purchase of other 3D-representations associated with the 3D-representation or associated with its components, features, accessories customizable components, related items or related item categories; a modification to the 3D-representation option, its components, features, accessories, customizable components, related items or related item categories; a selection option to generate an additional 3D-representation, accessories to the 3D-representation or related 3D-representations associated with the 3D-representation; a selection option to generate one of additional features a model of the 3D-representation, scenes in which the environment is placed or additional user experiences; and a user immersion activity option.

Further examples of interactive actions for POIs can be applied in the context of evaluating products for purchase. Within this environment, the following are interactive actions for the POIs: a user interface element that when selected causes a video or an animation, such an example of how the product functions, to appear on the screen, a link to text or an image, such as a narrative description of the feature to which the POI relates, or a link to at least a portion of another 3D-representation that is related to the 3D-representation presented on the display, components for the 3D-representation or accessories for the 3D-representation, such as products which potential purchasers generally review when viewing the 3D-representation presented on the display; as well as a link option to associated data, content, contextual or non-contextual data; a multimedia activity option; an animation option; a selection option to generate a related 3D-representation (such as, for example, for evaluating a product), components, features, accessories, customizable components, related products or related product categories; a selection option to generate a new user experience for the potential purchase of other 3D-representations associated with the 3D-representation or associated with its components, features, accessories customizable components, related products or related product categories; a modification to the 3D-representation option, its components, features, accessories, customizable components, related products or related product categories; a selection option to generate an additional 3D-representation, accessories to the 3D-representation or related 3D-representations associated with the 3D-representation; a selection option to generate one of additional features a model of the 3D-representation, scenes in which the environment is placed or additional user experiences; and a user immersion activity option. In an additional embodiment of the invention, the interactive actions for POIs can be implemented in the context of an e-commerce site. For example, the rendering the 3D-representation can be generated on an e-commerce platform to support a user experience in purchasing products and the 3D-representation can be at least in part based on a product for sale, with an interactive action including one or more of: a link to execute at least in part the purchase of the product; a link to text or an image; or a link to at least a portion of another 3D-representation that is related to the 3D-representation presented on the display, components for the 3D-representation or accessories for the 3D-representation. These are merely examples of particular actions and interactive experiences for users and means of effectuating such actions continue to involve. These are examples of approaches of presenting interactive actions and do not limit the embodiments of this invention. The techniques and systems described herein may be implemented in a number of ways. Example implementations are provided below with reference to the following figures.

FIG. 1 is a schematic diagram of an illustrative computing environment 100 useable to provide 3D models of items (hereinafter referred to as "3D-representation(s)" 104), 3D-representation images 102(1), 102(2) . . . , 102(N) (that is, 3D-representations of images on a display) for display with interactive POIs 106 for platforms 110. The environment 100 includes 3D-representation server(s) 120 that enable the creation of 3D-representation image data 122 and 3D-representation rotation data 124. The 3D-representation servers 120 enable the generation of 3D-representations 104 that can be displayed to users 112 in order for the users 112 to determine whether or not to purchase items via respective computing device(s) 130. The computing devices 130 presented to the users 112 provide a platform 110 supported by platform server(s) 118. The platform 110 is an example of one platform, the embodiments of this invention are not limited by the particular platform selected.

In an exemplary environment, the platform 110 enables a shopping experience for users 112, including the use of 3D-representation server(s) 120 to enable identification of 3D-representations 104, the presentation of 3D-representation images 102 based on 3D-representation image data 122 and the rotation of 3D-representation 104 based on the 3D-representation rotation data 124. The platform 110 further enables a shopping experience for users 112, including the use of the 3D-representation POI server(s) 140 to enable the presentation of POIs 106 and POI actions 108, based on the use of 3D-representation POI data 142 and 3D-representation POI action data 144. The 3D-representation POI server 140 enables rendering of one or more POIs 106 for 3D-representation 104 using the 3D-representation POI data 142, allowing for exploration of the related areas of the 3D-representation 104 by users 112 via respective computing devices 130. The 3D-representation POI server 140 further enables rendering of one or more POI actions 108 for each POI 106 for a 3D-representation 104 based on the 3D-representation POI action data 144.

A 3D-representation 104 can contain one or more POIs 106, depending upon the number and types of areas of interest for the 3D-representation. As described above, the POIs 106 can indicate a wide range of data associated with particular areas of interest of the 3D-representation. In an exemplary environment, such as the display of 3D-representations of items, areas of interest can include a feature, component, functionality, customizable component, optional component, and/or accessories, to name a few examples, without limiting a flexible range of data and approaches to defining particular areas of interest of the item. In addition, the POIs 106 can be determined from a range of sources, including the vendor of the item. For example, in an environment directed to the evaluation of products for purchase, the owner of the platform, data provided from public sources, analytics regarding previous features of the product or class of products that generally are reviewed by potential purchasers, previous features generally reviewed based on history of purchasing decisions of the users 112, or any number of factors which can be used to identify POIs 106. These are examples of methodologies for determining and/or creating POIs 106 for the 3D-representation 104; these examples do not limit the scope of the embodiments of this invention.

For example, a 3D-representation 104 can include a single POI 106, such as a POI 106 for the housing of the memory card, labeled "Memory Card", for a camera. In alternative embodiments, and continuing to use an exemplary camera item, a 3D-representation 104 can include multiple POIs 106 created for various areas of the 3D-representation 104. This embodiment is shown in FIG. 1, display 126 and 3D-representation images 102(1), (2) and 102(3), including multiple POIs 106 and POI actions 108 related to a camera item. The 3D-representation images 102(1), (2) and 102(3) and the presentation of the 3D-representation 104 and operations to produce the images 102(1), 102(2) and 102(3) are further described regarding FIG. 3A, below.

Continuing with this embodiment, the following are other potential areas of interest, as examples, which can be designated as POIs: a POI 106 labeled "Camera View Display" for a camera view display that is a unique feature based on its size and user interface functionality compared to other cameras, with the POI designation located at the top of the display of the camera; a POI 106 labeled "Battery Components," and located at the center of a battery located outside the battery housing for the camera; a POI 106 labeled "Selfie Rod Connector" located at the connection point on the bottom of the camera for connecting a selfie rod; and, a POI 106 labeled "Focus Controls," located at the control components for focus and zoom features. The identification and generation of POI actions described above are examples; these examples do not limit the scope of the embodiments of this invention.

In addition, based on the navigation of the 3D-representation 104 (as shown in the sequence of the 3D-representation images 102(1), 102(2) and 102(3)) by users 112, at a given orientation of the 3D-representation 104, only the POIs which are within the user's 112 viewing plane are presented on the display 126. Therefore, at any given time, where there are multiple POIs 106 for a given 3D-representation 104, the users 112 can view and dynamically interact with only those particular POIs that are within the user's 112 viewing plane and therefore selectable on the display 126 of the platform 110. For example, for the 3D-representation 104 as a camera (as described above), where the 3D-representation 104 is rotated so that the 3D-representation image 102 is orientated to present the POI 106 "Memory Card," (which generally is located on the right hand side panel of the camera), the front face of the camera 3D-representation image 102 is no longer within the viewing plane of the user 112. This orientation is shown in the 3D-representation image 102(2), with the camera rotated for a view of the memory card. As a result, the area of interest for the "CMOS sensor" is no longer visible. As a result, the POI 106 is no longer shown on the viewing plane of the display 126. Therefore, the number of POIs 106 that are presented to users 112 varies in number at a given orientation of the 3D-representation 104.

Similarly, while a 3D-representation 104 can have one or more POIs 106, each one of the POIs 106 for a given 3D-representation 104 also can contain one or more POI actions 108. The POI actions 108 presented to users 112 include at least one or more user-facing dynamic interactions related to the area of interest associated with the POI 106. In one embodiment, for example, POI actions 108 can include receiving additional contextual data, playing an animation, modifying the original 3D-representation image 102, playing sounds, loading other 3D-representations 104, changing the background of the 3D-representation image 102 as well as other dynamic interactions users 112 can have with areas of interest associated with the 3D-representation 104. The POI actions 108 shown for the 3D-representation 104 in 3D-representation image is 102(1), 102(2) and 102(3) are described in further detail below in FIG. 3 and a more extensive list of exemplary actions is provided above.

In addition, the number and/or types of POI actions 108 can be consistent for each of the POIs 106 on the 3D-representation 104. In an alternative embodiment, the POI actions 108 can differ for each of the POIs 106, or for at least one or more of the POIs 106. The embodiments herein give examples of the number or type of POI actions 108 across any or all of the POIs 106; these examples do not limit the scope of the embodiments of this invention. In still further embodiments, there is no organization in terms of the number or types of POIs 106 or POI actions 108. As a result, the total number or type of POIs 106 can be one or more, and for each individual POI 106, there can be no POI actions 108 associated with the POI 106, multiple actions or a dynamically changing number of actions. In another embodiment, at least one of the POIs 106 includes at least one POI 108 action. In addition, where a POI 106 does not include at least one POI 108 action, the POI 106 can be a POI 108 action itself. For example, the POI 106 can indicate a description of the related area of interest, so that when the POI 106 is selected, an expanded text box can be presented containing a description of the area of interest, while the label itself can be linkable to a transition to additional associated data. These are examples of combination of areas of interest and actions and numbers and types of POI actions 108; these examples do not limit the scope of the embodiments of this invention.

Figure 3A:
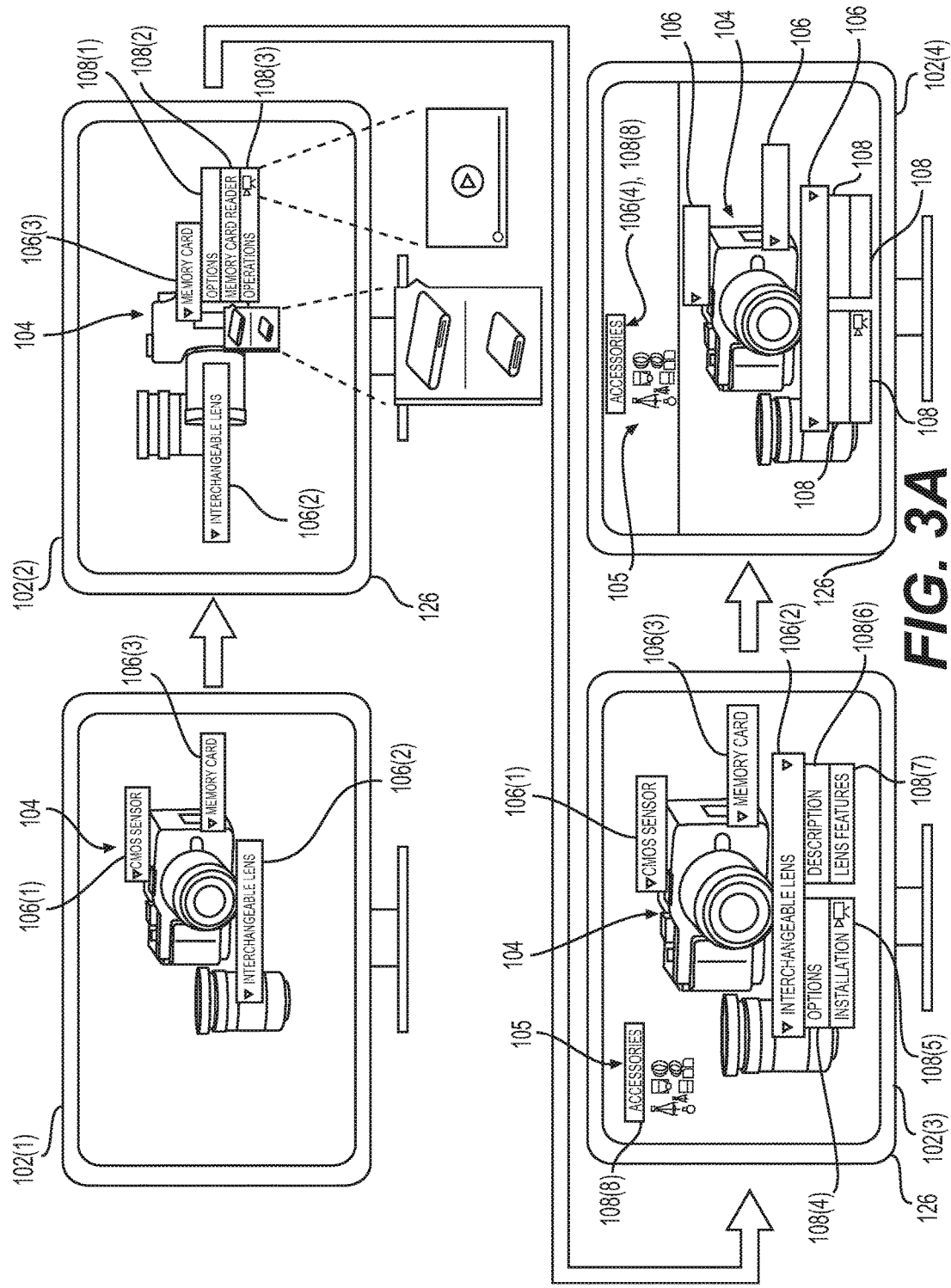
FIG. 3A is a schematic diagram of an illustrative computing environment, usable to provide a display for 3D-representations on a platform.

FIG. 1 also provides an example of a graphical user interface shown in the three versions of display 126, including: a 3D-representation 104 rendered to include a first (point of interest) (POI) 106, wherein the first POI 106(1) is associated with a first interactive action; an indication of the first interactive action for the first POI 106(1); and at least a portion of a related 3D-representation associated with the 3D-representation and rendered based on the selection of the indication of the first interactive action (as shown in FIG. 3A and discussed further below, with the related 3D-representation accessories 105).

Figure 2:
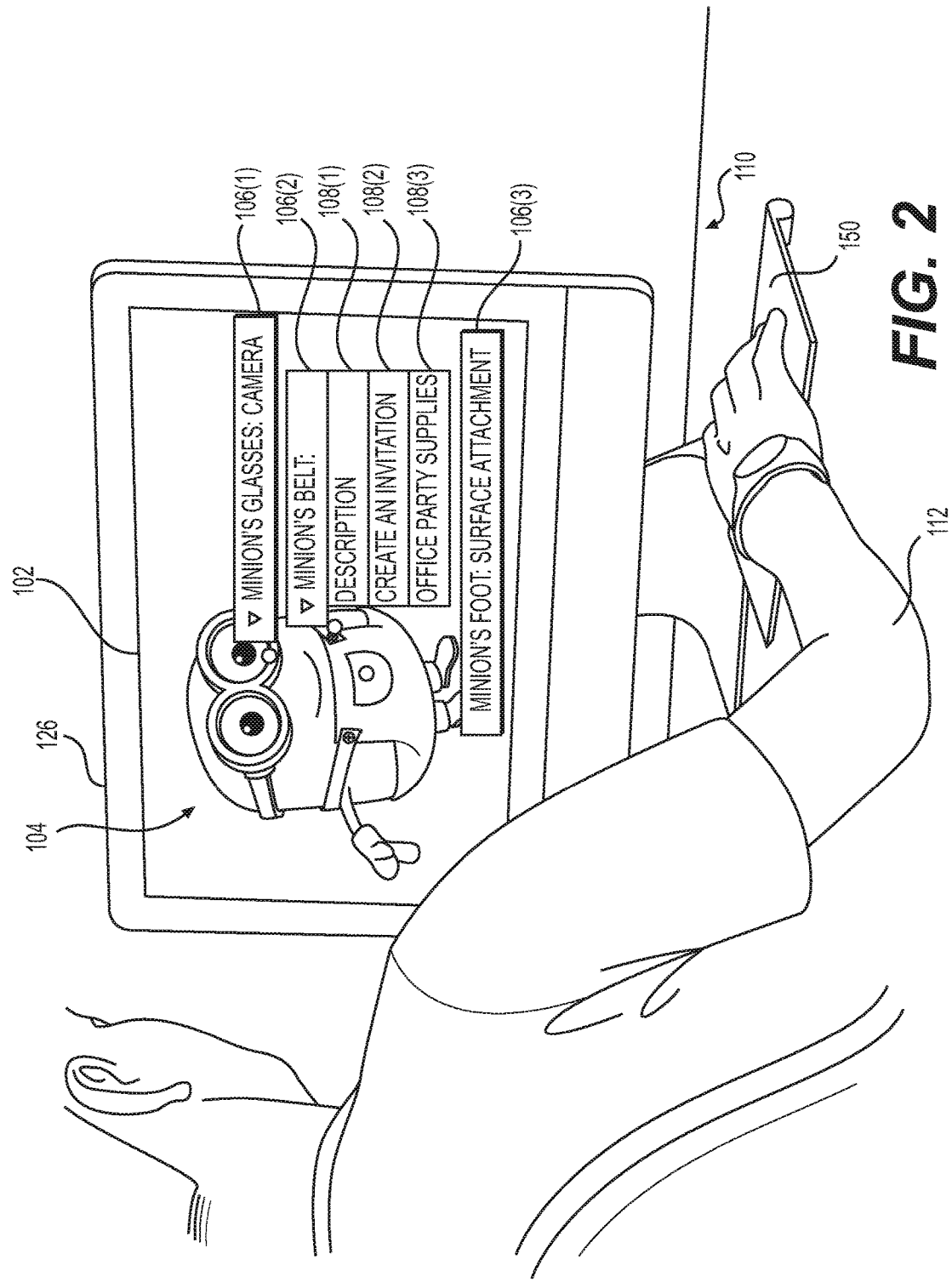
FIG. 2 is an illustrative platform displaying a 3D-representation including a 3D-representation image, POIs, POI actions and a user interacting via a display with the platform.

FIG. 2 is an illustrative platform 110 displaying a 3D-representation 104 including a 3D-representation image 102, POIs 106, POI actions 108 and a user 112 interacting via a display 126 with the platform 110. The first POI 106(1), as shown, can be associated with a foot of the Minion based on the location of the POI 106(1) as touching a portion of the foot and being labeled "Minion's Foot: Surface Attachment." The second POI 106(2) can be associated with the glasses of the Minion based on the location of the POI 106(2) as a touching (or adjacent to) the glasses feature of the 3D-representation 104, and being labeled "Minion's Glasses: Camera." The third POI 106(3) can be associated with the belt of the Minion based on the location of the POI 106(3) as a touching (or adjacent to) the belt feature of the 3D-representation 104, and being labeled "Minion's Belt: Camera Shutter." Further, in this embodiment, with a viewing plane of the 3D-representation 104 from the front perspective, all three of the POIs 106(1), 106(2) and 106(3) are viewable by the user 112 as they are all in the viewing plane.

In addition, each of the POIs 106(1), 106(2) and 106(3) are shown for the 3D-representation image 102, and for POI 106(2), POI actions 108 also are displayed. For the POI 106(2) labeled "Minion's Belt: Camera Shutter," the POI 106(2) is shown as expanded to present content representing multiple actions to provide additional data about the POI 106(2). The actions are shown in a list form, including the following examples: the first POI action 108(1) for the POI 106(2) is labeled "Description," which, when scrolled over or otherwise selected, can expand to explain that the belt is the camera shutter or video button to activate the camera feature of the Minion's glasses. The second POI action 108(2) for the POI 106(2) action is labeled "Create an Invitation," which is linkable. When activated, the link can open a sub-platform or transition to a new platform with a known invitation or calendaring applications. The third POI action 108(3) for the POI 106(2) is labeled "Office Party Supplies," and can be an option executable to initiate a different purchasing experience with a search of office party accessories to accompany the office event.

In this embodiment, only one of the POIs 106(1) is shown in expanded form with its respective POI actions 108(1), 108(2) and 108(3) fully presented. The 3D-representation 104 presentation can be preset to display fully expanded POI actions 108 for each of the POIs 106 presented on the viewing plane of the display 126. In alternative embodiments, expansion of the POIs 106 can be initiated by a different approaches. For example, when a user selection device, such as a track pad (as shown in FIG. 2, 150) or other indicator on the display 126, engages with a POI 106, the POI 106 can be dynamically expanded into multiple POI action 108 for further exploration of additional data associated with the area of interest of the 3D-representation related to the POI 106. The approach to displaying the POI actions 108 based on predetermined settings, or interaction by the user 112 does not limit the embodiments of this invention.

FIG. 3A is a schematic diagram of an illustrative computing environment 100, usable to provide a display for 3D-representations 104 on a platform 110. The illustrative platform 110 includes a series of four examples of the display 126 with 3D-representation images 102(1), 102(2), 102(3) and 102(4).

There are multiple POIs 106 shown for this exemplary embodiment of a camera shown in these 3D-representation images 102(1), 102(2), 102(3) and 102(4). The POIs are as follows: first, a POI 106(1) labeled "CMOS Sensor" is a component of the light sensor of the camera, with the POI located near the aperture opening up the lens. This POI 106(1) highlights a key component in digital SLR cameras for high-resolution and high-sensitivity light sensors. Second, there is a POI 106(2) for an interchangeable lens located at and associated with an edge of a lens inserted in the camera housing, as well as an interchangeable lens as part of the camera item shown adjacent to the camera. The POI 106(2) is labeled "Interchangeable Lens." In this alternative embodiment, the POI designation indicates both the lens inserted into the camera and the interchangeable lens that is part of the 3D-representation, such that the POI 106(2) is associated with two areas of interest of the 3D-representation, which in this case are related to each other. Third, a POI 106(3) labeled "Memory Card" is located adjacent to the memory card housing as it relates to the features of the memory card and a description of the alternatives available for memory card usable for the camera. Fourth, a POI 106(4) labeled "Accessories" is shown as added to and located in the 3D-representation images 102(3) and 102(4). In one embodiment, upon zooming in as part of the navigational capabilities of 3D-representations, an area of interest represented by a POI 106 can be added to a 3D-representation 104 and/or a 3D-representation image 102. These are examples of ways in which an accessories POI 106 can be added. The approach to adding new POIs 106 for introducing additional objects into the scene containing the 3D-representation, such as accessories, does not limit the embodiments of this invention.

The 3D-representation images 102(1), 102(2), 102(3) and 102(4) each present a different viewing plane of the 3D-representation 104 for the user 112. The 3D-representation 104 also includes, in this example, four POIs 106(1), 106(2), 106(3) and 106(4). For the 3D-representation image 102(1), three of the POIs 106(1), 106(2), 106(3) are visible to the user 112 on the display 126. In the 3D-representation image 102(2), due to a rotation of the 3D-representation 104, two of the POIs 106(2) and 106(3) are displayed within the viewing plane for the user 112. However, the rotation of the 3D-representation 104 has caused the area of interest for POI 106(1), the CMOS sensor, to be reoriented such that it is no longer in the viewing plane of the display 126. Therefore it is not shown in the 3D-representation image 102(2). As a result, the 3D-representation image 102(2) excludes the POI 106(1) and exemplifies the use of the POI 106(3) as a navigational aid in reorienting the 3D-representation 104 to the POI 106(3) as the area of interest.

In the 3D-representation image 102(3), according to one embodiment of the invention in which implementing the zoom feature causes a new POI to be placed into the scene for the 3D-representation 104 (such as an accessories POI), all POIs 106(1), 106(2), 106(3) and 106(4) are displayed in the viewing plane for the user 112.

The 3D-representation image 102(4) is shown for the purpose of presenting an alternative environment in which an additional 3D-representation 105 is added to the display 126. For an example of an environment for the evaluation of products for purchase, the production of this additional shopping experience can include a selection by the user 112 of the POI 106(4) accessories. This can cause an additional shopping experience to be presented to the user 112 on the same display 126, such that the display in this example is divided into upper and lower portions. The upper portion presents a new shopping experience with a 3D-representation 105 for accessories for the original 3D-representation 104 (which prompted the identification of accessories from which to select a second shopping experience), while the original 3D-representation 104 remains for presentation on the bottom portion of the display 126 to enable the user 112 to continue with the original shopping experience at the same time. In additional embodiments, the additional 3D-representation 104 can be for 3D-representations or related items which can prompt entirely new purchasing experiences, such as for example a camera prompting a 3D-representation of luggage based on the transition from cameras to bags which can house the cameras. In this way, the transition to new 3D-representations 104 can enable users to rapidly transition to 3D-representations. These are examples of shopping experiences; the examples provided herein do not limit embodiments of the invention.

In addition, each of the POIs 106(1), 106(2), 106(3) and 106(4) correspond to POI actions 108. For the POI 106(1) labeled "CMOS Sensor," the POI 106(1) is not shown as expanded in the 3D-representation images 102 of FIG. 3A. However, the POI 106(1) is shown with an object in the form of a drop down arrow that can be selected to expand to actions related to the CMOS sensor. In addition, upon scrolling near the designation, a window can he presented which describes the features and operation of the sensor.

The POI 106(2) "Interchangeable Lens" in this embodiment presents two action lists. The first list relates to the separate lens and is activated based on the arrow object located within the POI 106(2) designation adjacent to separate lens. The second list relates to the lens inserted in the camera housing and is activated based on the arrow object within the POI 106(2) designation adjacent to the inserted lens. In this manner, this POI 106(2) can provide alternative actions related to the area of interest. In alternative embodiments, the POI 106(2) also can have a single action object.

The 3D-representation image 102(3) shows the POI 106 (2) expanded for both of the action lists. The left side actions related to the separate lens are: the POI action 108(4) labeled "Options," which can be a link to show a variety of additional lenses which can be optionally purchased or can replace the lens as part of a customization option for the present 3D-representation 104. The next POI action 108(5) is labeled "Installation" and includes a video icon, which when activated can show how to install the separate lens. For the right side action list related to the inserted lens, POI action 108(6) is labeled "Description" which can be hyperlink to additional data about the lens inserted in the camera housing, as well as considerations for when to use the variety of lenses for interchangeable lens cameras. The POI action 108(7) is labeled "Lens features" and similarly can be a hyperlink to additional data about the features of the lens inserted in the camera housing.

In another alternative embodiment for the 3D-representation 104, the 3D-representation image 102(3) addition of the POI 106(4) "Accessories" (as described above, this can result from the user 112 zooming in on the 3D-representation 104) can also function as a POI action 108(8). Alternatively, the accessories illustrated underneath the POI 106 (4) can be the action objects. This alternative embodiment is an example of providing the POIs 106 and their related POI actions 108, including that the POIs 106 are POI actions 108 themselves.

Continuing with this alternative environment, when the POI action 108(8) is selected by the user 112, a new 3D-representation image 102(4) is presented in which the POI action 108(8) causes an additional shopping experience to be presented to the user 112 (as described above). In this 3D-representation image 102(4), the shopping experience includes the POI 106(4) as a new 3D-representation 105 presented on one portion of a split display 126. In this example, the 3D-representation 105 appears on the top portion of a split display for an individual shopping experience related to the accessories, with the 3D-representation 104 also presented on the same display 126 on the bottom portion. Another option is for the selection of the POI 106(4) "Accessories" to prompt a new display for just the accessories' shopping experience. These alternative environments also demonstrate examples of approaches for which the POIs 106 and the POI actions 108 can support the user 112 exploring additional data about the 3D-representation 104, including initiating additional shopping experiences for features, components, accessories etc. of the 3D-representation 104.

Figure 3B:
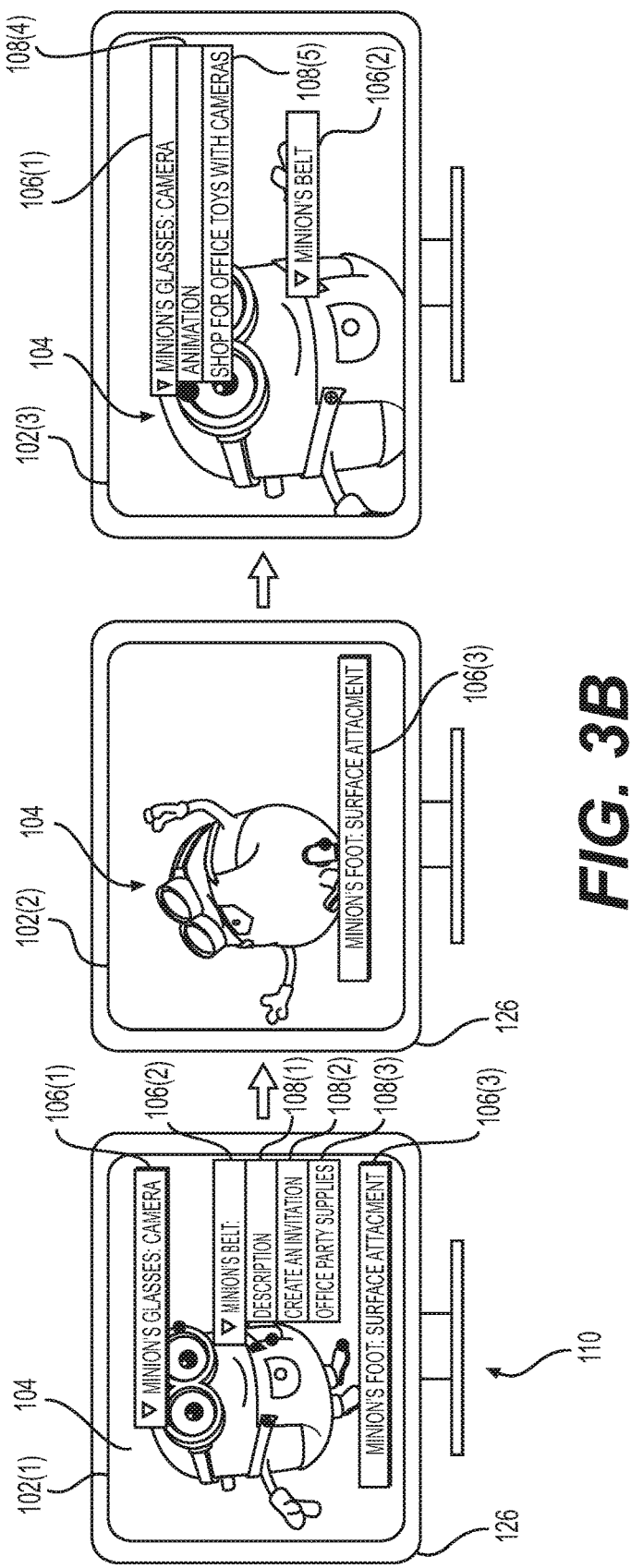
FIG. 3B is another schematic diagram of an illustrative computing environment, usable to provide a display for 3D-representations on a platform.

FIG. 3B is a schematic diagram of an illustrative computing environment 100, usable to provide a display for 3D-representations 104 on a platform 110. The illustrative platform 110 includes a series of three examples of the display 126 with 3D-representation images 102(1), 102(2) and 102(3). The 3D-representation images 102(1), 102(2) and 102(3) each present a different viewing plane of the 3D-representation 104 for the user 112. The 3D-representation 104 also includes, in this example, three POIs 106(1), 106(2) and 106(3). For the 3D-representation image 102(1), all three of the POIs 106(1), 106(2), 106(3) are visible to the user 112 on the display 126. In the 3D-representation image 102(2), due to a rotation of the 3D-representation 104, two of the POIs 106(2) and 106(3) are no longer within the viewing plane of the user 112. As a result, the 3D-representation image 102(2) includes only the POI 106(3). In the 3D-representation image 102(3), due to a zoom function being applied to the 3D-representation 104, one of the POIs 106(3) is no longer within the viewing plane of the user 112. As a result, the 3D-representation image 102(3) excludes the POI 106(3) and exemplifies a use of the zoom function as a navigational aid in manipulating the 3D-representation 104 to the POIs 106(2) and 106(3) as areas of interest.

In addition, POI actions 108(1), 108(2), 108(3), 108(4) and 108(5) are shown for the 3D-representation 104. For the POI 106(1) labeled "Minion's Glasses: Camera," the POI 106(1) is shown as expanded to present content representing multiple actions to provide additional data about the POI 106(1) in 3D-representation image 102(3). The actions are shown in a list form, including multiple actions: the first POI action 108(4) for the POI 106(1) is labeled "Animation," and can be a hyperlink, for example, to initiate an animation related to the Minion's glasses and their functionality. The second POI action 108(5) action for the POI 106(1) is labeled "Shop for Office Toys with Cameras." This POI action 108(5) can be implemented while maintaining a display of the 3D-representation 104, the user 112 can be asked whether or not to open a new purchasing experience in a new display or the display 126 can automatically transition to the new purchasing experience, as one of any number of approaches which can be used in alternative embodiments to execute actions selected by the user 112.

For the POI 106(2) labeled "Minion's Belt: Camera Shutter," the POI 106(2) is shown as expanded in 3D-representation image 102(1) to present content representing multiple actions. The actions are shown in a list form: the first POI action 108(1) for the POI 106(2) is labeled "Description," which, when scrolled over, can expand to explain that the belt is the camera shutter or video button to activate the camera feature of the Minion's glasses. The second POI action 108(2) for the POI 106(2) action is labeled "Create an Invitation." When activated, the icon can open a sub-platform or transition to a new platform with a known calendaring application. The third POI action 108(3) for the POI 106(2) action is labeled "Office Party Supplies," and can be an option executable to initiate a different purchasing experience with a search of office party accessories to accompany the office event. The POI actions 108(1), 108(2) and 108(3) for POI 106(2) also are described regarding FIG. 2 above. The POI 106(3) is shown as a description that can be expanded to show a description of the function of this component of the Minion Office Toy.

Figure 4:
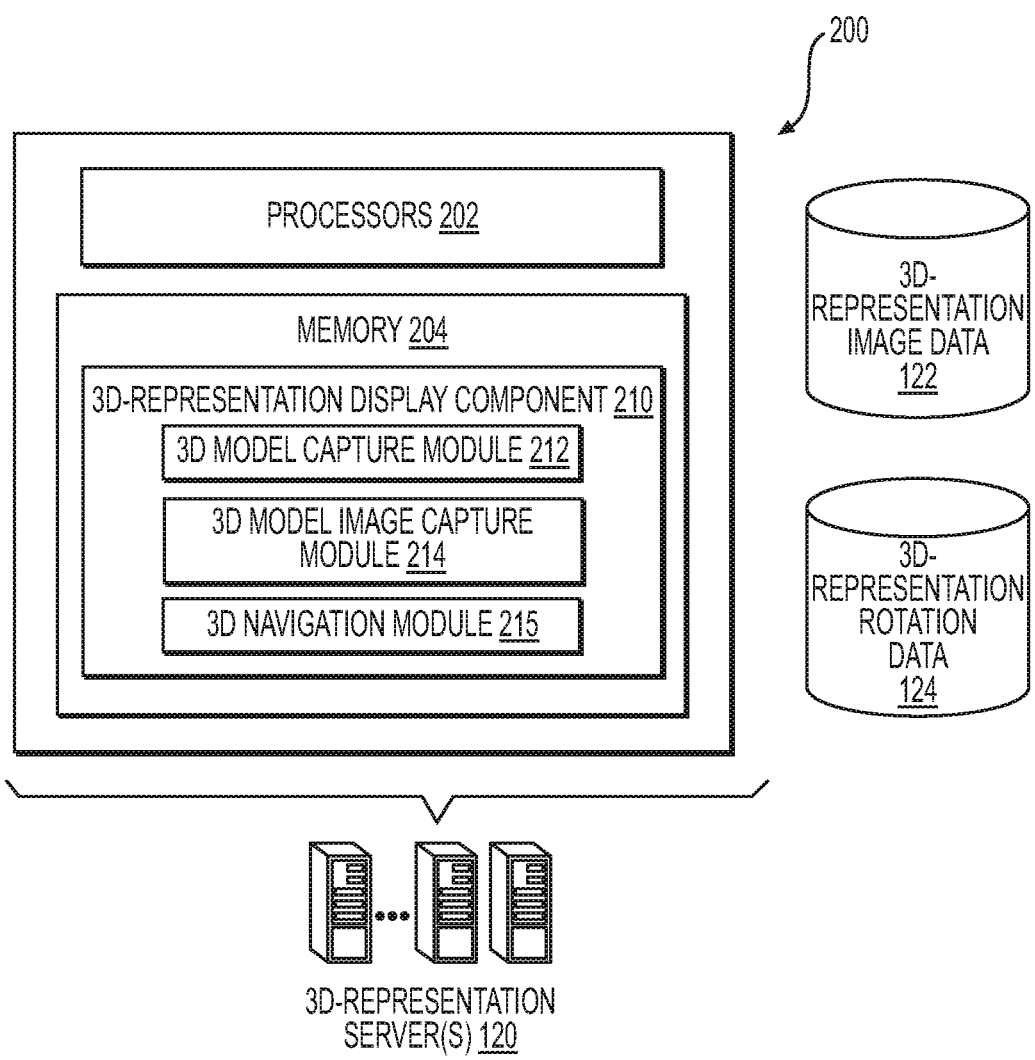
FIG. 4 is a block diagram of an illustrative computing architecture of 3D-representation servers to support the presentation of 3D-representation images for a 3D-representation on the display.

FIG. 4 is a block diagram of an illustrative computing architecture 200 of the 3D-representation servers 120 to support presentation of 3D-representation images 102 for the 3D-representation 104 on the display 126. The computing architecture 200 can be implemented in a distributed or non-distributed computing environment. While the 3D-representation servers 120 are shown for illustrative purposes in FIG. 4, as described above, the processing provided regarded in FIG. 4 can be implemented in a number of environments and such the use of server 120 is optional. More particularly, the processing environment in which capturing, authoring and rendering of 3D-representation 104 on the display 126 occurs can vary depending upon the implementation of these processes. For example, the processing can occur as a pre-processing step in any number of environments such as a cloud environment (not shown), 3D-representation servers 120 or other processing environment and files containing captured 3D-representations, authored POI and related components and/or data from which POIs and related components can be received at the local browser or client site (as shown in FIG. 1). Alternatively, portions of the processing, including the rendering the POIs, can occur at the local browser or client. These are examples of the approach to processing and presenting the 3D-representation remote from and at the local browser or client environment. These processes can occur in a variety of environments and therefore the environment in which the processing occurs does not limit the embodiments of this invention.

The computing architecture 200 can include one or more processors 202 and one or more computer-readable media 204 that store various modules, applications, programs, or other data. The computer-readable media 204 can include instructions that, when executed by the one or more processors 202, cause the processors to perform the operations described herein.

Embodiments can be provided as a computer program product including a non-transitory machine-readable storage medium having stored instructions thereon (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a non-transitory or transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 can store a 3D-representation display component 210, which can include a 3D model creation module 212, a 3D model image creation module 214 and a 3D model navigation module 215. As used herein, 3D model and 3D-representation are used interchangeably. The 3D-representation servers 120 can have access to the 3D-representation image data 122 and the 3D-representation rotation data 124 in order to enable the processing of the 3D-representation display component 210. The components and modules are described, in turn. The components/modules can be stored together or in a distributed arrangement.

The 3D-representation display component 210 can support the use of the 3D-representation image data 122 and the 3D-representation rotation data 124 to generate the 3D-representation 104 presentation on the display 126 (as shown in FIG. 1) of the 3D-representation images 102 and to navigate the 3D-representation 104 based on the user 112 initiating the navigational capabilities of the 3D-representation 104. The 3D-representation display component 210 can include various modules to assist in carrying out these operations. The 3D model of creation module 212 can enable the generation of the 3D-representation 104 and the 3D model image creation module 214 can enable the generation of the 3D-representation images 102. The 3D model navigation module 215 can enable the navigational capabilities of the 3D-representation 104, including using the POIs 106 (as shown in FIG. 1) when selected by the user 112 as navigational aids. The modules 212 and 215 can access the 3D-representation image data 122 and the 3D-representation rotation data 124 to perform their operations.

Figure 5:
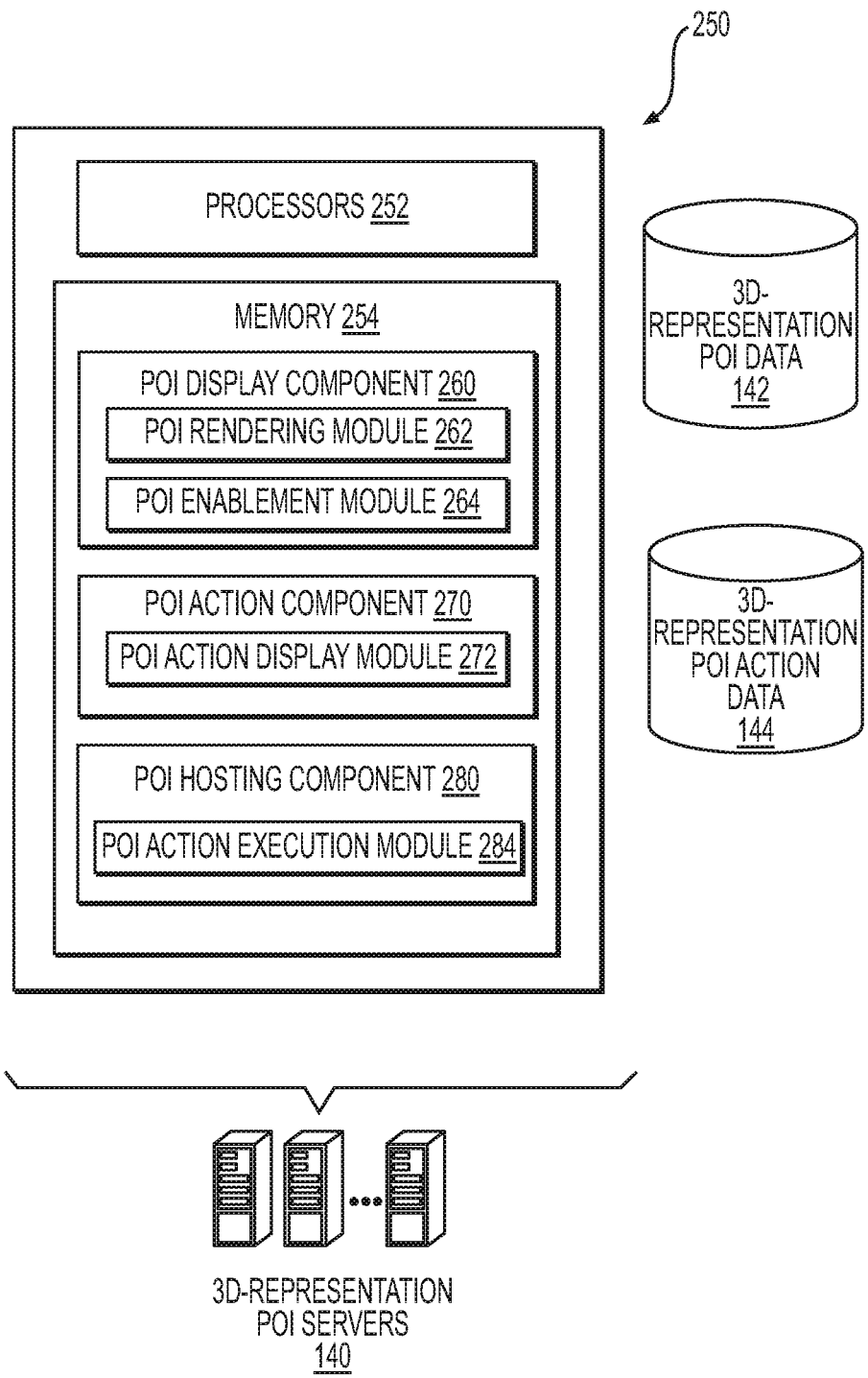
FIG. 5 is a block diagram of an illustrative computing architecture of 3D-representation POI servers to support the presentation of POIs and interactive actions for the POIs for a 3D-representation on the display.

FIG. 5 is a block diagram of an illustrative computing architecture 250 of the 3D-representation POI servers 140 to support presentation for a 3D-representation 104 (as shown in FIG. 1) of the POIs 106 and the POI actions 108. The computing architecture 250 can be implemented in a distributed or non-distributed computing environment.

While the 3D-representation POI servers 140 are shown for illustrative purposes in FIG. 4, as described above, the processing provided regarded in FIG. 4 can be implemented in a number of environments and such the use of 3D-representation POI servers 140 is optional. More particularly, the processing environment in which capturing, authoring and rendering of 3D-representation 104 on the display 126 occurs can vary depending upon the implementation of these processes. For example, the processing can occur as a pre-processing step in any number of environments such as a cloud environment (not shown), 3D-representation POI servers 140 or other processing environment and files containing captured 3D-representations, authored POI and related components and/or data from which POIs and related components can be received at the local browser or client site (as shown in FIG. 1). Alternatively, portions of the processing, including the rendering the POIs, can occur at the local browser or client. These are examples of the approach to processing and presenting the 3D-representation remote from and at the local browser or client environment. These processes can occur in a variety of environments and therefore the environment in which the processing occurs does not limit the embodiments of this invention.

The computing architecture 250 can include one or more processors 252 and one or more computer-readable media 254 that store various modules, applications, programs, or other data. The computer-readable media 254 can include instructions that, when executed by the one or more processors 252, cause the processors to perform the operations described herein. The embodiments described above for a FIG. 4 computer program product apply as well to the components of this FIG. 5.

In some embodiments, the computer-readable media 254 can store a 3D-representation POI display component 260, which can include a POI creation module 262 and a POI enablement module 264, a POI action component 270, which can include a POI action display module 272, and a POI hosting component 280, which can include a POI action execution module 284. The components and modules are described, in turn. The components/modules can be stored together or in a distributed arrangement.

The POI display component 260 uses the POI creation module 262 and the POI enablement module 264, as well as accessing the 3D-representation POI data 142, in order to generate the POIs for the 3D-representations. Both the approaches of creation and enablement are presented to cover embodiments where predetermined POIs are predetermined (such as by vendors), as well as where users are given the opportunity to create POIs during the purchasing experience.

The POI action component 270 uses the POI action display module 272, as well as accessing the 3D-representation action data 144, in order to generate the actions associated with the POIs for the 3D-representations. The POI hosting component 280 uses the POI action execution module 284, as well as accessing the 3D POI action data 144, to execute the actions selected by the user.

Figure 6:
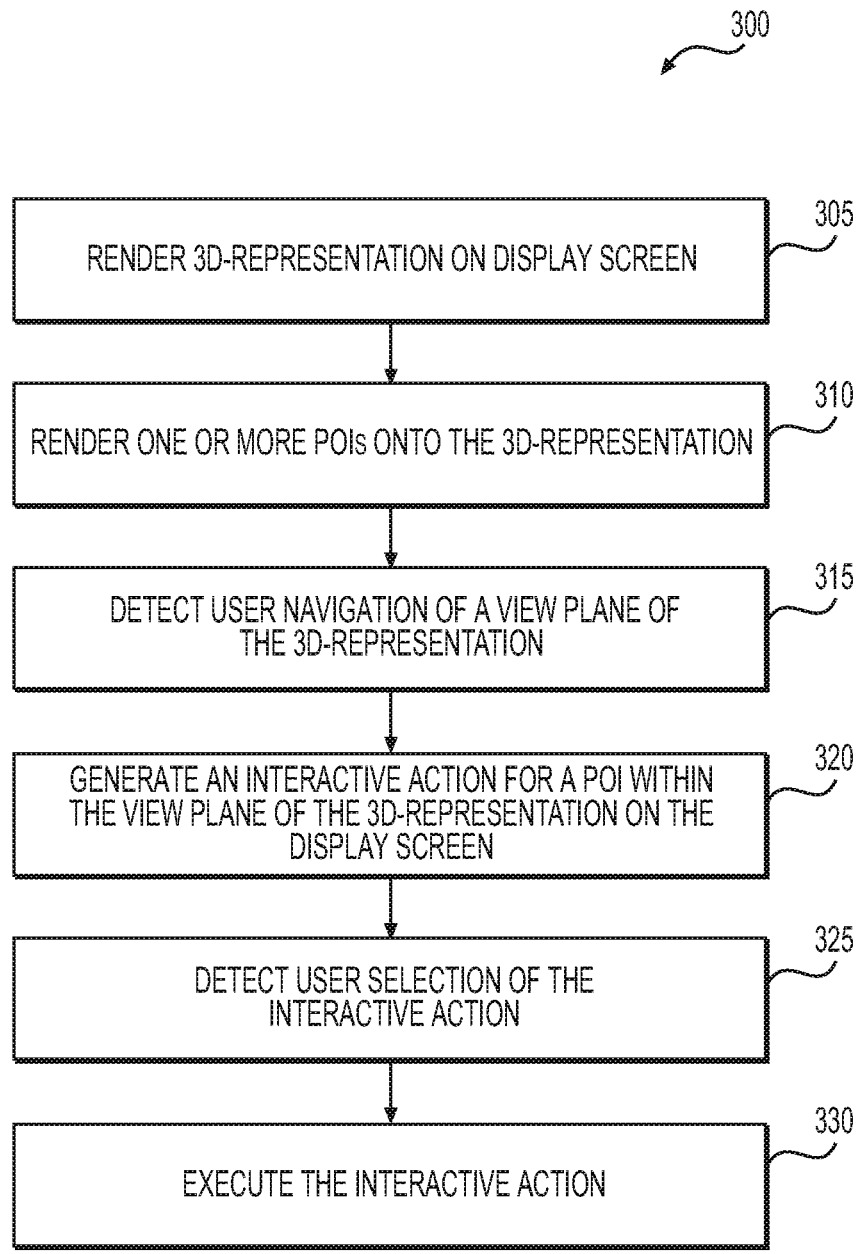
FIG. 6 is a flow diagram that shows a process for hosting interactive POIs for 3D-representations on a platform.

FIG. 6 is a flow diagram that shows a process for hosting interactive POIs for 3D-representations on a platform. The process 300 is illustrated as a collection of blocks in a logical flow graph, which represent a sequence of operations that can be implemented in hardware, software, or a combination thereof. The blocks are referenced by numbers 305-330.

In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation to embodiments of the invention. A client device, a remote content-item service, or both, may implement the described processes. The following description for FIGS. 6 and 7 includes references to the following items described above and shown in FIGS. 1, 3A, 4 and 5: as shown in FIG. 1, a 3D-representation 104, POIs 106, the user 112; as shown in FIG. 3A, the first 3D-representation image 102(1) of a camera and the second 3D-representation image 102(2); as shown in FIG. 4, a 3D-representation display component 210, 3D-representation image data 122, the 3D navigation model 215; as shown in FIG. 5, the POI display component 260, the POI action component 270, the POI hosting component 280 and the POI action execution module 284.

At 305, using the 3D-representation display component 210, a 3D-representation 104 is rendered on a display 126. In one embodiment, using the example of FIG. 3A, the 3D-representation 104 is a camera and the 3D-representation display component 210 renders a 3D-representation image 102 based on 3D-representation image data 122. For example, for the first 3D-representation image 102(1) in FIG. 3A, the viewing plane of the camera is shown from the front, and the 3D-representation image 102(1) includes a separate component of the camera (that is, an interchangeable lens, which in one embodiment can be a part of the camera purchase, or in an alternative environment, can be a separate purchase or accessory to the camera etc.).

At 310, using the POI display component 260, rendering is performed in order to anchor one or more POIs 106 to the 3D-representation 104. For example, as shown in FIG. 3A, for the 3D-representation image 102(1), three POIs 106(1), 106(2) and 106(3) are rendered in order to be anchored to the exemplary camera 3D-representation 104.

At 315, using the 3D navigation model 215, navigation by the user of the 3D-representation 104 on the display 126 is detected. This can result in a reorientation of the 3D-representation 104 so that a new viewing plane of the 3D-representation 104 is presented on the display 126. For example, as shown in FIG. 3A, the 3D-representation image 102(1) is navigated to reorient the 3D-representation 104 to a new viewing plane as shown in the 3D-representation image 102(2). As a result of this reorientation of the 3D-representation 104, the viewing plane presented on the display 126 shows the perspective of one side of the camera, such that the area near the lens aperture of the camera is outside the viewing plane presented on the display 126. As a result, the POI 106(1) is no longer presented on the display 126 for interaction by the user 112. In contrast, the viewing plane of 3D-representation image 102(2) includes presenting the POIs 106(2) and 106(3) on the display 126 for selection by the user 112.

At 320, using the POI action component 270, an interactive action is generated for a POI 106 within the viewing plane of the 3D-representation 104 on the display 126. For example, as shown in FIG. 3A, for the 3D-representation image 102(2), there are three examples of interactive actions generated for the POI 106(3), as this POI 106(3) is in the viewing plane of the 3D-representation 104. In this exemplary environment, the orientation of the POI 106(3) to the center area of the display (as described above) can trigger an automatic expansion of the POI 106(3) to display the POI actions 108(1), 108(2) and 108(3) on the display 126.

At 325, using the POI hosting component 280, a user selection of one of the interactive actions is detected. For example, as shown in FIG. 3A, for the 3D-representation image 102(2), where the user 112 selects the POI action 108(3), such as, for example, by the user 112 moving a cursor using a user 112 input device to activate the video icon shown as part of the POI action 108(3) designation, the process 300 includes a receipt of the user selection of the particular interactive action.

At 330, using the POI action execution module 284, the user selected one of the interactive actions is executed. For example, as shown in FIG. 3A, for the 3D-representation image 102(2), where the user 112 selects the POI action 108(3), by the user 112 providing a speech recognition command to select the POI action 108(3) interactive action, the process 300 continues with the execution of the user selected interactive action.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a memory, including computer-executable instructions that, when executed, cause the one or more processors to:
   render a first 3D-representation including a first point of interest (POI) and a second POI, wherein the first POI is associated with a first set of multiple interactive actions and the second POI is associated with a second set of multiple interactive actions;
present a user interface including the first 3D-representation on a display;
detect user navigation of the first 3D-representation on the display such that the first POI is displayed in a viewing plane of the first 3D-representation;
detect a first user selection of the first POI;
upon detection of the first user selection of the first POI, present in the user interface individual indications for each interactive action of the first set of multiple interactive actions;
detect a second user selection of a first indication for a first interactive action of the first set of multiple interactive actions;
execute the first interactive action by generating a second 3D-representation based at least upon the second user selection of the first indication, the second 3D-representation being related to the first 3D-representation;
present the second 3D-representation concurrently with the first 3D-representation as integrated features of the user interface;
detect a third user selection of a second indication for a second interactive action of the second set of multiple interactive actions; and
based at least upon the third user selection of the second indication, execute the second interactive action by rendering a third 3D-representation including a third POI, wherein:
the third POI is associated with a third set of multiple interactive actions,
the user interface is divided into at least two interactive portions displayed concurrently, the at least two interactive portions including a first interactive portion displaying the first 3D-representation and a second interactive portion displaying the third 3D-representation, and
the first interactive portion is rendered in an upper portion of the user interface and the second interactive portion is rendered in a lower portion of the user interface.

2. The system of claim 1, wherein the first interactive portion and the second interactive portion of the user interface are configured to receive a user interaction while being displayed concurrently.

3. The system of claim 1, wherein the first indication for the first interactive action comprises one of:
a user interface element that when selected causes a video or an animation to appear on the display;
a link to text or an image; and
a link to at least a portion of the third 3D-representation that is related to the first 3D-representation, components for the first 3D-representation, or accessories for the first 3D-representation.

4. A system comprising:
one or more processors;
a memory, including computer-executable instructions that, when executed, cause the one or more processors to:
render a first 3D-representation including a first point of interest (POI) and a second POI, wherein the first POI is associated with a first set of multiple interactive actions and the second POI is associated with a second set of multiple interactive actions;
present a user interface including the first 3D-representation on a display such that the first POI is displayed in a viewing plane of the first 3D-representation;
present in the user interface, a first indication of a first interactive action of the first set of multiple interactive actions for the first POI;
detect user navigation of the first 3-D representation on the display;
detect a first user selection of the first indication of first interactive action;
execute the first interactive action by generating a second 3D-representation based at least upon the first user selection of the first indication; and
present the second 3D-representation concurrently with the first 3D-representation as integrated features of the user interface;
present in the user interface, a second indication of a second interactive action of the second set of multiple interactive actions for the second POI;
detect a second user selection of the second indication of the second interactive action;
based at least in part on the second user selection of the second indication, execute the second interactive action by rendering a third 3D-representation including a third POI, wherein:
the third POI is associated with a third set of multiple interactive actions,
the user interface is divided into at least two interactive portions displayed concurrently, the at least two interactive portions including a first interactive portion displaying the first 3D-representation and a second interactive portion displaying the third 3D-representation, and
the first interactive portion is rendered in an upper portion of the user interface and the second interactive portion is rendered in a lower portion of the user interface.

5. The system of claim 4, wherein the first interactive portion and the second interactive portion of the user interface are configured to receive user interaction while being displayed concurrently.

6. The system of claim 4, wherein the second 3D-representation further includes a fourth POI associated with a fourth set of multiple interactive actions, and the memory further includes computer-executable instructions that cause the one or more processors to:
detect that a viewing plane of the second 3D-representation in the user interface includes the fourth POI;
upon detecting that the viewing plane of the second 3D-representation in the user interface includes the fourth POI, present a third indication of a third interactive action of the fourth set of multiple interactive actions in the user interface;
detect a third user selection of the third indication of the third interactive action; and
execute the third interactive action.

7. The system of claim 6, wherein the fourth POI is further associated with a fourth interactive action, and the memory further includes computer-executable instructions that cause the one or more processors to:
upon detecting that the viewing plane of the second 3D-representation in the user interface includes the fourth POI, present in the user interface, the third indication of the third interactive action and a fourth indication of the fourth interactive action;

detect a fourth user selection of the fourth indication of the fourth interactive action; and execute the fourth interactive action.

8. The system of claim 6, wherein the memory further includes computer-executable instructions that cause the one or more processors to:

detect that the viewing plane of at least the portion of the first 3D-representation in the user interface includes the first POI;

present in the user interface the first indication of the first interactive action;

detect that the viewing plane of at least the portion of the second 3D-representation in the user interface includes the fourth POI;

present in the user interface the third indication of the third interactive action;

detect user selection of the third indication of the third interactive action; and execute the third interactive action.

9. The system of claim 4, wherein the first indication of the first interactive action comprises one of:

a user interface element that when selected causes a video or an animation to appear on the display;

a link to text or an image; and a link to at least a portion of the third 3D-representation that is related to the first 3D-representation, components for the first 3D-representation, or accessories for the first 3D-representation.

10. The system of claim 4, wherein the first POI is further associated with static content, the static content comprises text or an image.

11. A system comprising:

one or more processors;

a memory, including computer-executable instructions that, when executed, cause the one or more processors to:

render a first 3D-representation including a first point of interest (POI) and a second POI, wherein the first POI is associated with a first set of multiple interactive actions and the second POI is associated with a second set of multiple interactive actions;

detect user navigation of the first 3D-representation in a user interface such that the first POI and the second POI are displayed in a viewing plane of the first 3D-representation, and wherein the first POI is located within a predetermined area including a center point of the user interface and the second POI is located outside of the predetermined area;

detect a first user selection of the first POI;

upon detection of the first user selection of the first POI, present in the user interface a first indication of a first interactive action of the first set of multiple interactive actions;

detect a second user selection of the first indication of the first interactive action;

execute the first interactive action by generating a second 3D-representation based at least upon the second user selection of the first indication, the second 3D-representation being related to the first 3D-representation; and present the second 3D-representation concurrently with the first 3D-representation as integrated features of the user interface;

present in the user interface, a second indication of a second interactive action of the second set of multiple interactive actions;

detect a third user selection of the second indication of the second interactive action;

based at least in part on the third user selection of the second indication, execute the second interactive action by rendering a third 3D-representation including a third POI, wherein:

the third POI is associated with a third set of multiple interactive actions, the user interface is divided into at least two interactive portions displayed concurrently, the at least two interactive portions including a first interactive portion displaying the first 3D-representation and a second interactive portion displaying the third 3D-representation, and the first interactive portion is rendered in an upper portion of the user interface and the second interactive portion is rendered in a lower portion of the user interface.

12. The system of claim 11, wherein the memory further includes computer-executable instructions that cause the one or more processors to:

detect user selection of the second POI based at least partly on detecting placement of a cursor near the second POI prior to expiration of a predetermined period of time;

present in the user interface an indication of an additional interactive action of the second set of multiple interactive actions;

detect user selection of the indication of the additional interactive action; and execute the additional interactive action by presenting at least a portion of the third 3D-representation in at least the portion of the user interface.

13. The system of claim 12, wherein the memory further includes computer-executable instructions that cause the one or more processors to:

upon completion of the additional interactive action, present the first 3D-representation in the user interface in an orientation of the viewing plane presented prior to the selection of the additional interactive action.

14. A graphical user interface, comprising:

a first 3D-representation rendered to include a first point of interest (POI) and a second POI, wherein the first POI is associated with a first set of multiple interactive actions and the second POI is associated with a second set of multiple interactive actions;

a first indication of a first interactive action of the first set of multiple interactive actions for the first POI;

at least a portion of a second 3D-representation rendered concurrently with the first 3D-representation based on selection of the first indication of the first interactive action as integrated parts of the graphical user interface;

a second indication of a second interactive action of the second set of multiple interactive actions for the first POI; and based on selection of the second indication of the second interactive action, a third 3D-representation including a third POI, wherein:

the third POI is associated with a third set of multiple interactive actions, the graphical user interface is divided into at least two interactive portions displayed concurrently, the at least two interactive portions including a first interactive portion displaying the first 3D-representation and a second interactive portion displaying the third 3D-representation, and the first interactive portion is rendered in an upper portion of the user interface and the second interactive portion is rendered in a lower portion of the user interface.

15. A method comprising:
rendering a first 3D-representation including a first point of interest (POI) and a second POI, wherein the first POI is associated with a first set of multiple interactive actions and the second POI is associated with a second set of multiple interactive actions;
presenting the first 3D-representation in a user interface;
detecting user navigation of the first 3D-representation in the user interface such that the first POI is displayed in a viewing plane of the first 3D-representation;
detecting first user selection of the first POI;
presenting in the user interface a first indication of a first interactive action of the first set of multiple interactive actions;
detecting second user selection of the first interactive action;
executing the first interactive action by generating a second 3D-representation based at least upon the second user selection of the first indication, the second 3D-representation being related to the first 3D-representation;
presenting the second 3D-representation concurrently with the first 3D-representation as integrated features of the user interface;
presenting in the user interface a second indication of a second interactive action of the second set of multiple interactive actions;
detecting third user selection of the second interactive action; and
based at least upon the third user selection of the second indication, executing the second interactive action by rendering a third 3D-representation including a third POI, wherein:
the third POI is associated with a third set of multiple interactive actions,
the user interface is divided into at least two interactive portions displayed concurrently, the at least two interactive portions including a first interactive portion displaying the first 3D-representation and a second interactive portion displaying the third 3D-representation, and
the first interactive portion is rendered in an upper portion of the user interface and the second interactive portion is rendered in a lower portion of the user interface.

16. The method as recited in claim 15, wherein the second 3D-representation includes a fourth POI associated with a fourth set of multiple interactive actions, and the method further comprising:
detecting that the viewing plane of the second 3D-representation in the user interface includes the fourth POI;
upon detecting that the viewing plane of the second 3D-representation in the user interface includes the fourth POI, presenting a third indication of a third interactive action of the fourth set of multiple interactive actions in the user interface;
detecting a fourth user selection of the third indication of the third interactive action; and
executing the third interactive action.

17. The method of claim 16, the method further comprising:
upon detecting that the viewing plane of the second 3D-representation in the user interface includes the fourth POI, presenting a fourth indication of a fourth interactive action of the fourth set of multiple interactive actions in the user interface;
detecting a fifth user selection of the fourth indication of the fourth interactive action; and
executing the fourth interactive action.

18. The method as recited in claim 15, the method further comprising:
detecting that the viewing plane of at least a portion the first 3D-representation in the user interface includes the first POI;
presenting on the display the first indication of the first interactive action;
detecting that the viewing plane of at least a portion of the second 3D-representation in the user interface includes the second POI;
presenting in the user interface the second indication of the second interactive action;
detecting the second user selection of the second indication of second interactive action; and
executing the second interactive action.

19. The method as recited in claim 15, wherein:
the first 3D-representation is generated on an e-commerce platform to support a user experience in purchasing products and the first 3D-representation is at least in part based on a product for sale; and
the first indication of the first interactive action comprises one of:
a link to execute at least in part a purchase of the product;
a user interface element that when selected causes a video or an animation to appear on the screen;
a link to text or an image; and
a link to at least a portion of the third 3D-representation that is related to the first 3D-representation presented in the user interface, components for the first 3D-representation, or accessories for the first 3D-representation.

20. The method as recited in claim 15, wherein the first interactive portion and the second interactive portion of the user interface are configured to receive user interaction while being displayed concurrently.

* * * * *